Figure 6:
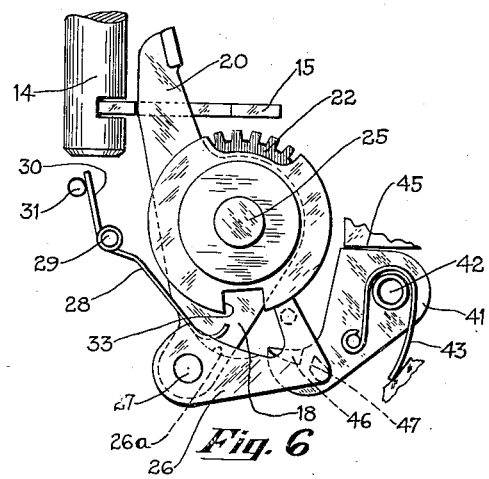

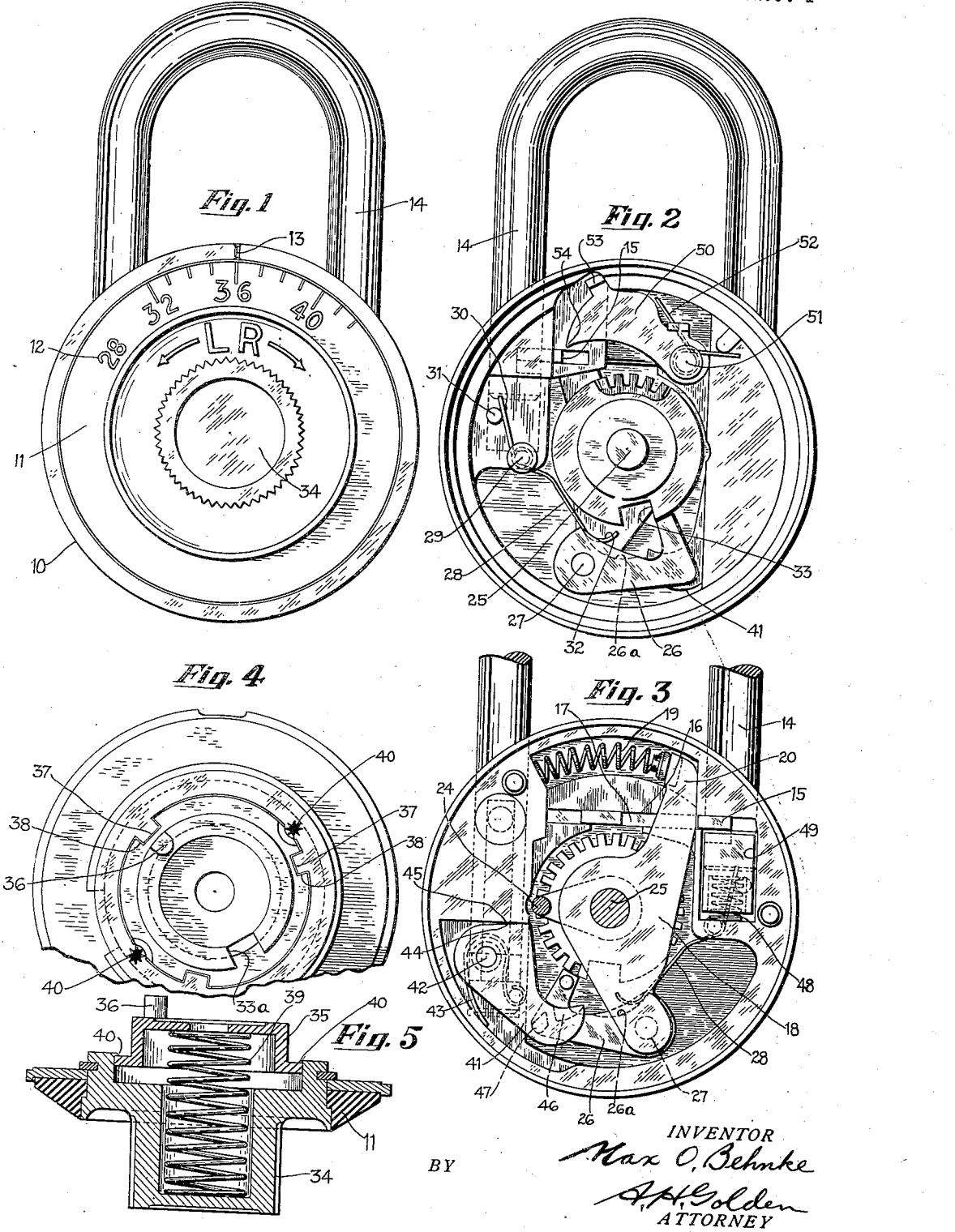

April 5, 1938.   M. O. BEHNKE   2,112,979
COMBINATION PADLOCK
Filed Oct. 12, 1935   3 Sheets-Sheet 2

INVENTOR
Max O. Behnke
BY A. H. Golden
ATTORNEY

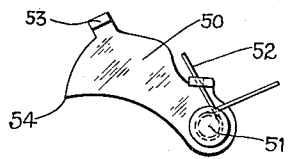
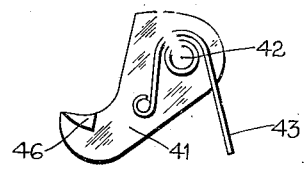
Fig. 11  Fig. 13
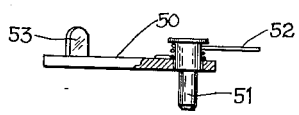
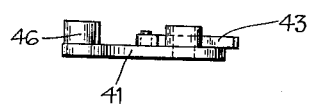
Fig. 12  Fig. 14
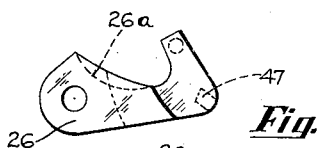
Fig. 15
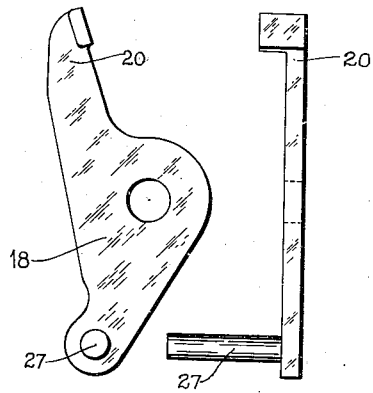
Fig. 17  Fig. 18
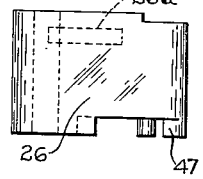
Fig. 16
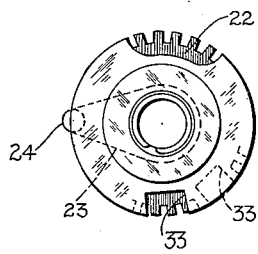
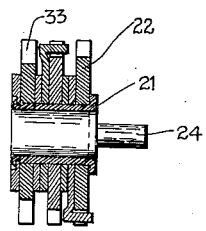
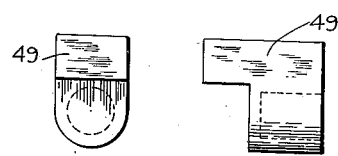
Fig. 19  Fig. 20  Fig. 21  Fig. 22
INVENTOR
Max O. Behnke
BY
ATTORNEY Patented Apr. 5, 1938

2,112,979

UNITED STATES PATENT OFFICE 2,112,979

COMBINATION PADLOCK

Max O. Behnke, Stamford, Conn., assignor to The Yale & Towne Manufacturing Company, Stamford, Conn., a corporation of Connecticut Application October 12, 1935, Serial No. 44,702

20 Claims. (Cl. 70—25)

This invention relates to combination padlocks. More especially, the invention relates to that type of combination padlock in which when a series of tumblers are alined with their gatings in particular relation to a fence, the fence may enter the gatings so that thereafter rotation of the tumblers and the fence will retract a bolt to release the padlock shackle.

In a padlock of this type, it becomes essential to provide certain operations which have become commercially important. I believe that in my padlock I have devised certain means for obtaining various operations, which means are basically novel.

As a part of my invention, I have devised a very novel form of shackle locking bolt, and a very novel form of bolt retracting cam for retracting the locking bolt. Preferably, the fence which is adapted to enter the tumbler gatings is pivotally mounted on the bolt retracting cam and is so controlled that when the bolt is thrown and the shackle is locked, the fence will normally be pressed in a direction to permit its movement into the tumbler gatings when those gatings become alined. I provide means whereby once the tumblers and the fence are rotated together so as to move the bolt retracting cam into bolt retracting position, the fence will be urged out of the tumbler gatings. It is the dual control of the fence which is the distinctive feature of the particular construction indicated.

My fence is preferably mounted so as to be actuated by a single spring, which in one position of the fence will press it against the tumblers, and which in another position of the fence will press it away from the tumblers and out of the alined gatings. Of course, various other means could be provided, such as two springs, one operating in one position of the fence and the other in another position of the fence, and in the claims appended hereto, I shall claim the construction so broadly as to cover a wide range of equivalents.

In combination preferably, but not necessarily, with this type of fence, I provide means whereby the fence and cam will be rotated away from a position opposite the tumbler gatings once the bolt is retracted and tension between the tumblers and the fence, set up during the retracting movement, is relieved. Incidentally, this tension between the fence and the tumbler gatings acts against the fence pressing spring to maintain the fence within the gatings during a portion of the bolt retracting movement, as will be readily appreciated. It is possible to rely solely on this pressure, although I prefer to add other assisting means.

Preferably, cooperating with the fence, I have mounted a deadlocking detent which has a plurality of functions. This detent cooperates with the fence so as to deadlock the fence and therefore the bolt retracting cam against movement in a bolt retracting direction, when the fence is not in the tumbler gatings.

Since, preferably, the cam is normally maintained against the bolt when the bolt is locking the shackle, the deadlocking detent thus deadlocks the shackle and bolt. Once the fence has moved into the alined gatings, the deadlocking detent is no longer positioned relatively to the fence so as to deadlock the fence, and it is possible to rotate the tumblers and the fence as previously indicated. During the initial portion of this rotation, the deadlocking detent serves to maintain the fence within the tumbler gatings and thus assists the spring which normally is provided to so maintain the fence. Once the spring changes the directional actuation of the fence, the detent alone holds the fence in proper position, aided, of course, by the pressure between the gatings and fence. The fence and the bolt retracting cam are moved back in a locking direction after the fence has moved the cam to retract the bolt, as will be recalled. While this movement is intended to carry the fence away from the alined gatings, as a precautionary move, I utilize my deadlocking detent to guide the fence away from the tumbler gatings and back into a position in which it may once again become deadlocked when the bolt moves into shackle locking position.

While the means for deadlocking the fence and therefore the cam and bolt are practically completely effective, it is conceivably possible under some conditions to "rap" the padlock so as to vibrate the deadlocking detent, and thereby permit also a creeping outwardly of the bolt relatively to the shackle. This "rapping" of a padlock is a problem which has long troubled padlock manufacturers, and is well known in the padlock industry. All good padlocks are so manufactured that they are "rap" proof.

The construction of my fence and deadlocking lever is such that "rapping" only in such a particular manner as to transmit vibrations in a particular direction will permit release of the deadlocking of the bolt. In order to counteract such rapping action, I provide a deadlocking lever which is adapted to move into deadlocking position under the influence of the same vibrations which are adapted to move the deadlocking detent out of deadlocking position. This I consider a very important feature of the invention.

While I have now described the general combination and a few of the important features of my invention, there are more detailed features of importance which I intend to claim as my invention, and which will be described later. It should also be understood that I have made a relatively broad contribution to the art, and that I am therefore entitled to broad claims and a broad interpretation of those claims, and that I should not be limited to the particular specific features shown herein.

Referring now to the drawings, Fig. 1 is a plan view of my padlock. Fig. 2 is a view showing the dial of Fig. 1 removed so that the various parts may be readily seen. Fig. 3 is a view of the padlock of Fig. 1 from the rear, with the rear plate cut away, showing the operation of the parts. Fig. 4 is an under view of the dial, while Fig. 5 is a section through the dial showing the construction thereof and the means for applying uniform pressure to the tumblers. Figs. 6–10, inclusive, illustrate in diagrammatic form the operation of the parts shown in Figs. 2 and 3.

Figs. 11 and 12 are respectively a plan and side view of the deadlocking lever of my invention. Figs. 13 and 14 are respectively plan and side views of the deadlocking detent of my invention. Figs. 15 and 16 are respectively plan and side views of the fence utilized in my invention. Figs. 17 and 18 are plan and side views of the bolt retracting cam. Figs. 19 and 20 are plan and sectional views of the tumbler assembly. Figs. 21 and 22 are plan and side views of the bolt holding plunger.

Referring now more particularly to the drawings, reference numeral 10 represents the casing of a padlock having a dial 11 bearing indicia 12, the dial being rotatable relatively to a fixed index point 13 on the casing in a manner well understood by those skilled in the art, so as to set the tumblers of the padlock. The shackle is designated by reference numeral 14, being normally maintained locked by a sliding shackle locking bolt 15 mounted for sliding movement in a groove 16 in the body of the padlock. The bolt 15 is slotted as at 17 and in this slot operates the arm 20 of a bolt retracting cam 18 normally spring pressed by a spiral spring 19 so as to hold the arm 20 against the bolt 15 to maintain it in its position of Figs. 3 and 6. The positioning of spring 19 and bolt 15 are of special interest in this construction.

The tumblers 22 used in my padlock are mounted on an assembly sleeve member 21 (Figs. 19 and 20), which maintains the tumblers in proper position, the sleeve member 21 having an extension 23 equipped with a pin 24 which enters a bore in the bottom of the casing, thus maintaining the tumblers in proper relation. The sleeve 21 fits about a post 25 rising from the bottom of the padlock, and on this post 25 is mounted the cam 18 for rotation under the influence of the spring 19, and for bolt retracting movement under the influence of a fence 26 which is mounted on the pin 27 of the cam 18.

Figure 7:
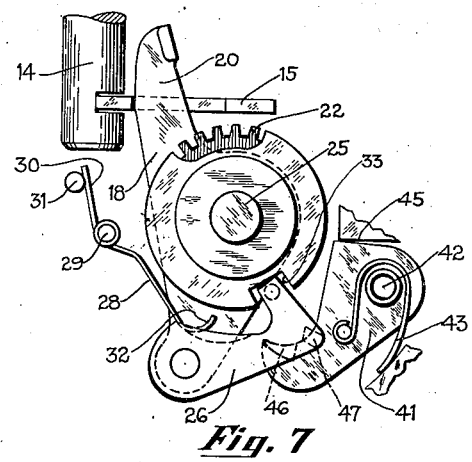

A spring 28 (Figs. 2 and 6) is coiled about a fixed post 29 on the casing and has one end 30 bearing against a post 31 on the casing, while the other end is curved as at 32 and bears against the fence 26, lying in the groove 26a of the fence. In the position of Figs. 2, 3 and 6, the spring 28 will so cooperate with the fence 26 and groove 26a as to tend to force the fence nose into the alined gatings 33 of the tumblers 22. Once the fence has entered the tumbler gatings as shown in Fig. 7, it is readily appreciated that rotation of the tumblers by the operating dial, by means to be described hereinafter, will move the tumblers and fence from the position of Fig. 7 to the position of Fig. 9, in which position it will be observed that the spring 28 is so positioned relatively to the fence 26 as to tend to urge the fence nose out of the alined gatings 33.

Figure 8:
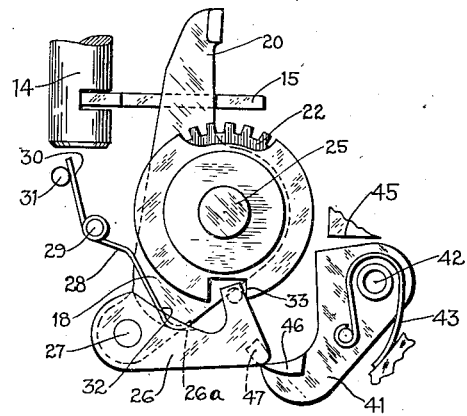
Figure 9:
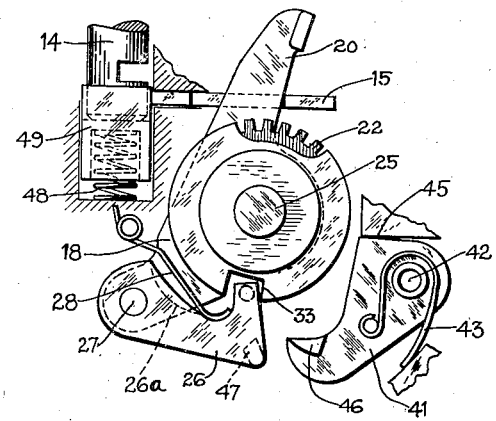

The force of the spring 28 is, of course, overcome by the friction developed between the sides of the gatings 33 and the nose of the fence 26. It will be noted that until the bolt 15 is retracted as shown in Fig. 9, a deadlocking detent 41, shown acting in Fig. 8, assists in keeping the fence in the gatings. This detent and its operation will be described more in detail hereinafter.

For rotating the tumblers individually to aline their gatings and for thereafter rotating the tumblers and the fence so as to retract the bolt, I utilize the dial 11 which is integrally movable with a knob 34, as will be best appreciated by viewing Figs. 4 and 5. An operating disc 35 having a tumbler rotating pin 36 is supported by the knob 34 and in sliding relation thereto through means of a series of lugs 37 on the knob body cooperating with the grooves 38 on the disc 35. A spring 39 urges the disc 35 outwardly relatively to the knob 34 and against the tumblers, so as to maintain uniform pressure on the tumblers. The disc 35 has also a gating 33a, similar to tumbler gatings 33, and which coacts with the fence 26 just as do the tumbler gatings. The endwise movement of the disc 35 relatively to the knob 34 is limited by a pair of staked portions 40, shown in Figs. 4 and 5. The pin 36 cooperates with the tumblers in a manner well known in the art, and it is not thought necessary to illustrate or describe further the manner in which the tumblers may be operated to aline the gatings.

It is quite apparent in viewing Figs. 2 and 3, that some means must be provided for deadlocking the cam 18 and fence 26. For so deadlocking the fence 26 and cam 18, I utilize the deadlocking detent 41 (Figs. 13 and 14) mounted on a pin 42 and spring pressed by a spring 43 in a clockwise direction, as shown in Figs. 6–10, inclusive, so as to bring its surface 44 against a shoulder 45 of the body of the padlock. The normal position of the deadlocking detent 41 relatively to the fence 26 is probably best illustrated in Figs. 3 and 6.

An integral lug 46 on the deadlocking detent 41 is maintained opposite a lug 47 on the fence 26, and in this position of the parts, only a slight movement of the fence and therefore the cam 18 is possible in a clockwise direction, looking at Fig. 6. When, however, the fence 26 enters the alined gatings 33 as is best shown in Fig. 7, then the lug 47 is so displaced relatively to the lug 46 that an under cam surface of the lug 47 will by-pass the lug 46 and force the detent 41 downwardly against the action of its spring 43, as is best shown in Fig. 8. This action takes place, of course, during the rotation of the tumblers 22 integrally with the fence 26.

Continued movement from Fig. 8 to the position of Fig. 9 of the parts, will bring the lug 47 past the lug 46, and thereafter, only the continued tension between the fence 26 and the gatings 33 will maintain the fence in position against the pressure of the spring 28. It will be observed that in the position of Fig. 9, the bolt 15 has been retracted by the arm 20 of the cam 18, and the shackle 14 has been released for outward movement under the influence of a spring 48 operating behind a bolt holding member 49. It will be readily appreciated that once the shackle has been moved into released position, as illustrated in Fig. 9, the bolt holding member 49 will maintain the bolt 15 in unlocked position until the shackle is once more inserted to depress the member 49. This construction in its broad aspects is well known in this art.

Figure 10:
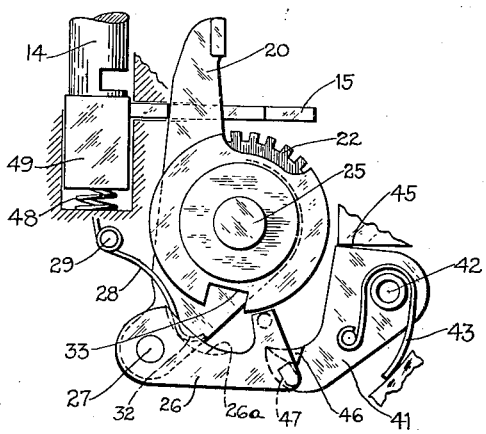

Once tension between the gatings 33 of the tumblers 22, and the nose of the fence 26, has been relieved, the spring 28 will remove the fence from the gatings, and under the influence of the spring 19, the cam 18 and the fence will be moved to the position illustrated in Fig. 10. Further movement of the cam 18 from the position of Fig. 10 to the position of Fig. 6 will be impossible until the shackle 14 has been fully inserted, permitting the bolt 15 to move to the left from the position of Fig. 10 to the position of Fig. 6.

During this movement, the fence and the cam will move so that the lug 47 of the fence will once again move behind lug 46 of the deadlocking detent, and the parts will be retained in their original position of Fig. 6. It will be readily appreciated that during this movement from Fig. 10 to Fig. 6, the lug 46 serves also to guide the fence 26 and to prevent its movement other than as intended, until the fence is once again placed under the influence of the spring 28, tending to maintain it in position against the periphery of the tumblers.

As was previously indicated, it may conceivably, although concededly remotely, be possible under some conditions to rap the padlock so as to remove the deadlocking detent 41 from its deadlocking relation to the fence 26. This movement would only be possible by rapping so as to induce vibrations in a particular direction.

In order to prevent releasing under the influence of such vibrations, I utilize a deadlocking lever 50 illustrated in Figs. 2, 11, and 12 which is mounted on the pivot 51 relatively to the casing, and is normally pressed by a spring 52 in a clockwise direction so as to bring its lug 53 up against a solid portion of the casing and in a position so that its nose 54 will be clear of the bolt 15. Such vibrations as may conceivably, however, move the deadlocking detent 41 out of deadlocking position will move the nose 54 behind the bolt 15 so as to deadlock the bolt, as will be readily appreciated.

I now claim:

1. In a padlock of the class described, a shackle, a bolt for locking said shackle, means for deadlocking said bolt, means yieldingly holding said deadlocking means in an inoperative position, said deadlocking means being movable against said yieldingly holding means when said padlock is rapped whereby to deadlock said bolt.

2. In a padlock of the class described, a shackle, a bolt for locking said shackle, a deadlocking lever for said bolt, a spring holding said lever out of deadlocking position, said lever being movable against said spring and into deadlocking position relatively to said bolt when said padlock is rapped.

3. In a padlock of the class described, a shackle, a bolt for locking said shackle, said bolt being releasable by rapping only when said padlock is rapped in a particular manner with the vibrations applied in a particular direction, and deadlocking means for said bolt normally maintained out of deadlocking position relatively to said bolt and movable into deadlocking relation thereto when said padlock is rapped in said particular manner.

4. In a padlock of the class described, a shackle, means for locking said shackle, a rotary cam for releasing said shackle from said locking means, a fence movable with said cam, a series of tumblers having gatings into which said fence enters when said gatings are aligned whereby rotation of said tumblers rotates the cam, means tending to move said fence into said gatings in one position of said fence and out of said gatings in another position of said fence, and a spring for moving said fence and cam bodily relatively to said gatings from said other position to said first position.

5. In a padlock of the class described, a series of tumblers having gatings, a movable fence adapted to enter said tumbler gatings in a predetermined initial alined position of said gatings, means for aligning said tumbler gatings and for thereafter moving said tumblers and said fence from said initial position to a second position, a spring adapted to resist this movement of the fence and tumblers from the initial position to said second position, and a spring urging said fence into said gatings when in said initial position, and out of said gatings in said second position, said fence being movable back to its initial position by said first spring when released from the gatings by said second spring.

6. In a padlock of the class described, a series of tumblers having gatings, a movable fence adapted to enter said tumbler gatings in a predetermined initial alined position of said gatings, means for moving said tumblers and said fence from said initial position to a second position, a spring adapted to resist this movement of the fence and tumblers from the initial position to said second position, and a spring urging said fence into said gatings when in said initial position, and out of said gatings when in said second position, the tension between said tumblers and said fence when approaching the second position being sufficient to overcome the urging of said tumblers out of the gatings by said spring, said fence being movable back to its initial position by said first spring when released from the gatings by said second spring.

7. In a padlock of the class described, a series of tumblers having gatings, a movable fence adapted to enter said tumbler gatings in a predetermined initial alined position of said gatings, means for moving said tumblers and said fence from said initial position to a second position, means whereby said fence is urged into said gatings when in said initial position, and out of said gatings when in said second position, and means for preventing movement of the fence out of said alined gatings until said fence is substantially in said second position.

8. In a padlock of the class described, a shackle, a bolt for locking said shackle, a bolt retracting cam, a fence mounted on said cam, a series of tumblers having gatings, said fence being movable into said gatings when alined, means for rotating said tumblers together with said fence and cam whereby to retract said bolt, and a spring pressed means blocking the movement of said fence in a releasing direction for deadlocking said bolt and cam against movement until said fence enters said gatings to bypass said means, said means being depressible against the spring pressure to permit return of said fence to its initial position while said fence is out of the gatings.

9. In a padlock of the class described, a shackle, a bolt for locking said shackle, a series of tumblers having gatings, means for retracting said bolt including a fence adapted to enter said gatings, spring pressed means for deadlocking said retracting means until said fence enters said gatings, and an anti-rapping lever adapted to move to deadlocking position relatively to said shackle upon a rapping action tending to release said spring pressed deadlocking means.

10. In a padlock of the class described, a shackle, a bolt for locking said shackle, a bolt retracting cam, a fence mounted on said cam, a series of tumblers having gatings, said fence being adapted to enter said tumbler gatings in a predetermined initial position of said gatings, means for moving said tumblers and said fence from said predetermined initial position to a release position whereby to actuate the cam to retract said bolt, spring means urging said fence into said tumbler gatings when said fence and gatings are in said initial position, and urging said fence out of said gatings when said bolt has been retracted by movement of said fence to said second position, and a spring for resisting the movement of said fence and cam and adapted to return the fence and cam to said initial position when said fence is urged by said spring means out of the aligned gatings.

11. In a padlock of the class described, a shackle, a bolt for locking said shackle, a bolt retracting cam, a fence mounted on said cam, a series of tumblers having gatings, said fence being adapted to enter said tumbler gatings in a predetermined initial position of said gatings, means for moving said tumblers and said fence from said predetermined initial position to a release position whereby to actuate the cam to retract said bolt, spring means adapted to urge said fence into said tumbler gatings when said fence and gatings are in said initial position, and to urge said fence out of said gatings when said bolt has been retracted by movement of said fence to said release position, a lost motion connection between said bolt and said fence whereby when said cam and fence leaves the gatings it may move back to said initial position without simultaneous movement of said bolt, and a spring compressed during the retraction of the bolt for so moving said fence.

12. In a padlock of the class described, a shackle, a bolt for locking said shackle, means for retracting said bolt including a fence, a series of tumblers having gatings adapted to be alined in an initial position, a deadlocking detent adapted to prevent bolt retracting movement of said fence and said retracting means until said fence has entered said alined gatings, means for rotating said tumblers and thereby moving said fence and retracting means to retract said bolt, spring means urging said fence out of said gatings when in said bolt retracting position, means whereby said deadlocking detent guides said fence back to deadlocked position when it leaves the aligned gatings, and spring means for moving said fence back to said deadlocked position upon its leaving said gatings.

13. In a padlock of the class described, a shackle, a bolt for locking said shackle, means for retracting said bolt including a fence, a series of tumblers having gatings adapted to be alined in an initial position, a deadlocking detent adapted to prevent bolt retracting movement of said fence and said retracting means until said fence has entered said alined gatings, means for rotating said tumblers and thereby moving said fence and retracting means to retract said bolt, spring means urging said fence out of said gatings when in bolt retracting position and normally overcome by the tension between the gatings and fence and adapted to move the fence as soon as said pressure is relieved after retraction of the bolt, means whereby said deadlocking detent guides said fence back to deadlocked position when it leaves the alined gatings, and spring means for moving said fence back to said deadlocked position upon its leaving said gatings.

14. In a padlock of the class described, a shackle, a bolt for locking said shackle, a rotating bolt retracting cam, a spring for maintaining said cam against movement to bolt retracting position, means adapted to maintain said bolt in retracted position once said shackle is released and moved outwardly from the padlock and adapted to release said bolt for projection into locking engagement with the shackle when the shackle is reinserted, a fence for said cam, a series of tumblers having gatings into which said fence enters when said gatings are alined, means for rotating said tumblers and said fence and cam against said spring pressure on the cam whereby to retract said bolt and release the shackle, spring means effective to press said fence out of said gatings once said fence has moved to bolt retracting position, whereby said fence and cam may then be moved relatively to said bolt and tumblers by the spring pressure on said cam.

15. In a padlock of the class described, a shackle, a bolt for locking said shackle, a rotating bolt retracting cam, a spring for maintaining said cam against movement to bolt retracting position, means adapted to maintain said bolt in retracted position once said shackle is released and moved outwardly from the padlock and adapted to release said bolt for projection into locking engagement with the shackle when the shackle is reinserted, a fence for said cam, a series of tumblers having gatings into which said fence enters when said gatings are alined, means for rotating said tumblers and said fence and cam against the spring pressure on the cam whereby to retract said bolt and release the shackle, spring means effective to press said fence out of said gatings once said fence has moved to bolt retracting position, whereby said fence and cam may then be moved relatively to said tumblers by the spring pressure on said cam to disalign the fence relatively to said tumbler gatings, and means of connection between said cam and bolt whereby said cam and fence may move while leaving said bolt held retracted.

16. In a combination lock, a series of tumblers mounted in superimposed stack form, a dial and knob assembly, a tumbler adjusting member carried by and rotatable with said knob and having means for adjusting said tumblers, and means whereby said member is spring pressed relatively to said dial in a direction against said tumblers and away from said knob whereby to tension said tumblers during adjustment thereof.

17. In a padlock of the class described, a shackle, a bolt for locking said shackle, an anti-rapping lever for deadlocking said shackle against release through the rapping of said bolt, means yieldingly holding said anti-rapping lever out of deadlocking position, said anti-rapping lever being movable against said yieldingly holding means into deadlocking position when said padlock is rapped whereby to prevent release of said shackle.

18. In a padlock of the class described, a shackle and cam operated means for locking said shackle and for releasing it for movement outwardly from said padlock, an anti-rapping lever, means mounting said anti-rapping lever so as normally to allow for free operation of said shackle and said cam operated means, said anti-rapping lever being movable on said mounting means into position to prevent release of said shackle upon rapping of said padlock tending to release said shackle surreptitiously.

19. In a combination lock, a series of tumblers mounted in superimposed stack form, a dial and knob assembly, a tumbler adjusting member rotatable integrally with said dial and knob while slidable relatively thereto, a spring adapted to press said member so as to slide it in a direction against said tumblers whereby to tension said tumblers while adjusting them to a predetermined combination.

20. In a padlock of the class described, a shackle, a bolt for locking said shackle, a series of tumblers having gatings, bolt retracting means including a fence movable into said gatings when aligned whereby rotation of said tumblers thereafter will retract said bolt, a spring pressed deadlocking detent positioned to prevent movement of said fence and bolt retracting means until said fence has entered the gatings, and means whereby said deadlocking detent yieldingly maintains the fence within said gatings until said bolt is retracted sufficiently to release said shackle.

MAX O. BEHNKE.